(12) United States Patent
Kim et al.

(10) Patent No.: US 11,487,376 B2
(45) Date of Patent: Nov. 1, 2022

(54) TOUCH DISPLAY DEVICE

(71) Applicant: LG DISPLAY CO., LTD., Seoul (KR)

(72) Inventors: JuHong Kim, Paju-si (KR); HwiDeuk Lee, Paju-si (KR); Hyunsuk Cho, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 17/459,575

(22) Filed: Aug. 27, 2021

(65) Prior Publication Data

US 2022/0206610 A1 Jun. 30, 2022

(30) Foreign Application Priority Data

Dec. 29, 2020 (KR) .......................... 10-2020-0185887

(51) Int. Cl.
*G06F 3/041* (2006.01)
*G06F 3/044* (2006.01)

(52) U.S. Cl.
CPC .......... *G06F 3/0412* (2013.01); *G06F 3/0446* (2019.05); *G06F 3/04164* (2019.05); *G06F 2203/04107* (2013.01)

(58) Field of Classification Search
CPC combination set(s) only.
See application file for complete search history.

(56) References Cited

U.S. PATENT DOCUMENTS

2020/0004368 A1* 1/2020 Kim ...................... G06F 3/0412
2021/0132733 A1* 5/2021 Lee ....................... G06F 3/0412

* cited by examiner

*Primary Examiner* — Robin J Mishler
(74) *Attorney, Agent, or Firm* — Polsinelli PC

(57) ABSTRACT

A touch display device includes a shield electrode disposed between a touch electrode and a display electrode, by not disposing the touch electrode and the shield electrode on a part of an area overlapping with a data line, thus direct and indirect coupling by the data line can be reduced and a crosstalk by a coupling between a touch signal and a display signal can be reduced. Furthermore, in the case that the shield electrode is disposed on a layer where a connecting pattern connecting between the touch electrode and the touch line is disposed, by maintaining an arrangement of the shield electrode on some area where the data line is overlapped and the touch electrode isn't disposed, thus an effect of a coupling reduction can be provided while maintaining a noise blocking performance of the shield electrode stably.

19 Claims, 16 Drawing Sheets

TOUCH DISPLAY DEVICE

CROSS-REFERENCE TO RELATED APPLICATION

This application claims priority from Korean Patent Application No. 10-2020-0185887, filed on Dec. 29, 2020, which is hereby incorporated by reference in its entirety for all purposes as if fully set forth herein.

BACKGROUND

Field of the Disclosure

The present disclosure is related to a touch display device.

Description of the Background

The growth of the information society leads to increased demand for display devices to display images and use of various types of display devices, such as liquid crystal display devices, organic light emitting display devices, etc.

The display devices can recognize a touch by a finger or a pen of a user touched to a display panel for providing more various functions to the user. The display devices can perform an input processing for driving the display devices based on the recognized touch.

The display devices can include a plurality of touch electrodes embedded in the display panel, or disposed on the display panel. The display devices can detect a change of a capacitance in a state that a touch driving signal is applied to the touch electrode and can sense the touch of the user.

The display panel can include an electrode and a signal line for a display driving other than the touch electrode. Thus, a parasitic capacitance can be made between the electrode for the display driving and the touch electrode for a touch sensing.

Due to this parasitic capacitance, problems are present that a performance of the display driving is dropped, or an accuracy of the touch sensing is dropped.

SUMMARY

Accordingly, the present disclosure provides a method of capable of preventing that a performance of a touch sensing is dropped or an abnormality of a display driving is occurred due to a parasitic capacitance between an electrode for the touch sensing and an electrode for the display driving.

Also, the present disclosure provides a methods of capable of improving the performance of the touch sensing while minimizing the number of layers where the electrode for the touch sensing is disposed, in a structure that the electrode for the touch sensing is embedded in a display panel.

Further, the present disclosure provides a touch display device including a plurality of touch electrodes disposed in a display panel, a plurality of touch lines electrically connected to each of the plurality of touch electrodes, and at least one shield electrode disposed on an area overlapped with at least a portion of the plurality of touch electrodes and the plurality of touch lines.

The each of the plurality of touch electrodes may include at least one vertical sensor portion disposed in a first direction, and a plurality of horizontal sensor portions disposed in a second direction crossing the first direction and connected to the at least one vertical sensor portion.

The plurality of horizontal sensor portions may include at least one first horizontal sensor portion partially overlapping with a data line disposed in the display panel, and at least one second horizontal sensor portion shorter than the at least one first horizontal sensor portion and disposed on an area other than an area overlapped with the data line.

The at least one shield electrode may be disposed on an area other than an area overlapped with the data line in an area adjacent to the at least one second horizontal sensor portion.

Alternatively, the at least one shield electrode may be disposed on an area other than an area overlapped with the data line in an area adjacent to one of the at least one second horizontal sensor portion, and is disposed on an area overlapped with the data line in an area adjacent to other one of the at least one second horizontal sensor portion.

In another aspect, the present disclosure provides a touch display device including a plurality of touch electrodes disposed in a display panel, and a plurality of touch lines electrically connected to each of the plurality of touch electrodes, wherein the each of the plurality of touch electrodes includes at least one vertical sensor portion disposed in a first direction, and a plurality of horizontal sensor portions disposed in a second direction crossing the first direction and connected to the at least one vertical sensor portion, wherein the plurality of horizontal sensor portions includes at least one first horizontal sensor portion partially overlapping with a data line disposed in the display panel, and at least one second horizontal sensor portion shorter than the at least one first horizontal sensor portion and disposed on an area other than an area overlapped with the data line.

In another aspect, the present disclosure can provide a touch display device including a plurality of data lines disposed in a display panel, a plurality of touch electrodes and a plurality of touch lines disposed on a layer different from a layer where the plurality of data lines is disposed, and at least one shield electrode disposed on a layer located between a layer where the plurality of data lines is disposed and a layer where the plurality of touch electrodes and the plurality of touch lines are disposed, wherein the at least one shield electrode is disposed on some areas of a plurality of areas where the plurality of data lines is overlapped and the plurality of touch electrodes and the plurality of touch lines aren't disposed, and isn't disposed on other some areas of the plurality of areas.

According to various aspects of the present disclosure, by disposing a shield electrode between an electrode for a touch sensing and an electrode for a display driving, and by not disposing a touch electrode and the shield electrode on some areas overlapped with a data line, both direct and indirect coupling between the touch electrode and the data line can be reduced and a performance of the touch sensing can be improved.

According to various aspects of the present disclosure, by disposing the shield electrode on a same layer as a layer where a connecting pattern connecting the touch electrode and a touch line is disposed, and by disposing the shield electrode on some areas of areas where the data line overlaps and the touch electrode isn't disposed and by not disposing the shielding electrode on other some areas, a structure being capable of enhancing the performance of the touch sensing can be provided without increasing the number of layers due to an arrangement of the shield electrode.

BRIEF DESCRIPTION OF THE DRAWINGS

The above features and advantages of the present disclosure will be more clearly understood from the following detailed description, taken in conjunction with the accompanying drawings, in which.

DETAILED DESCRIPTION

Figure 1:
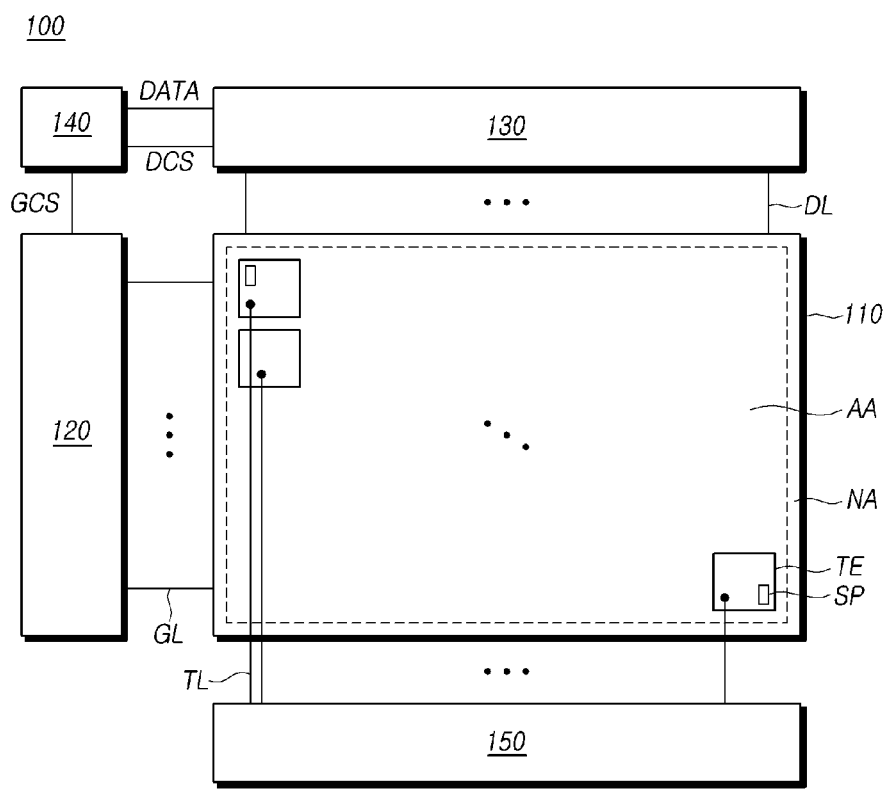
FIG. 1 is a diagram schematically illustrating components included in a touch display device according to aspects of the present disclosure.

In the following description of examples or aspects of the present disclosure, reference will be made to the accompanying drawings in which it is shown by way of illustration specific examples or aspects that can be implemented, and in which the same reference numerals and signs can be used to designate the same or like components even when they are shown in different accompanying drawings from one another. Further, in the following description of examples or aspects of the present disclosure, detailed descriptions of well-known functions and components incorporated herein will be omitted when it is determined that the description may make the subject matter in some aspects of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the present disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

FIG. 1 is a diagram schematically illustrating components included in a touch display device 100 according to aspects of the present disclosure.

Referring to FIG. 1, the touch display device 100 according to aspects of the present disclosure can include a display panel 110 including an active area AA where a plurality of subpixels SP is disposed and a non-active area NA which is located outside the active area AA. The touch display device 100 can include a gate driving circuit 120, a data driving circuit 130 and a controller 140 for driving various signal lines disposed in the display panel 110.

A plurality of gate lines GL and a plurality of data lines DL can be disposed in the display panel 110. The plurality of subpixels SP can be located in areas where the gate lines GL and the data lines DL intersect each other.

The gate driving circuit 120 is controlled by the controller 140, and sequentially outputs scan signals to the plurality of gate lines GL arranged on the display panel 110, thereby controlling the driving timing of the plurality of subpixels SP.

The gate driving circuit 120 can include one or more gate driver integrated circuits GDIC. The gate driving circuit 120 can be located only at one side of the display panel 110, or can be located at both sides thereof according to a driving method.

Each gate driver integrated circuit GDIC can be connected to a bonding pad of the display panel 110 by a tape automated bonding TAB method or a chip-on-glass COG method, or can be implemented by a gate-in-panel GIP method to then be directly arranged on the display panel 110. In some cases, each gate driver integrated circuit GDIC can be integrated and arranged on the display panel 110. In addition, each gate driver integrated circuit GDIC can be implemented by a chip-on-film COF method in which an element is mounted on a film connected to the display panel 110.

The data driving circuit 130 receives image data from the controller 140 and converts the image data into an analog data voltage Vdata. Then, the data driving circuit 130 outputs the data voltage Vdata to each data line DL according to the timing at which the scan signal is applied through the gate line GL so that each of the plurality of subpixels SP emits light having brightness according to the image data.

The data driving circuit 130 can include one or more source driver integrated circuits SDIC.

Each source driver integrated circuit SDIC can include a shift register, a latch circuit, a digital-to-analog converter, an output buffer, and the like.

Each source driver integrated circuit SDIC can be connected to a bonding pad of the display panel 110 by a tape automated bonding TAB method or a chip-on-glass COG method, or can be directly disposed on the display panel 110. Alternatively, in some cases, each source driver integrated circuit SDIC can be integrated and arranged on the display panel 110. In addition, each source driver integrated circuit SDIC can be implemented by a chip-on-film COF method in which each source driver integrated circuit SDIC can be mounted on a film connected to the display panel 110, and can be electrically connected to the display panel 110 through wires on the film.

The controller 140 supplies various control signals to the gate driving circuit 120 and the data driving circuit 130, and controls the operation of the gate driving circuit 120 and the data driving circuit 130.

The controller 140 can be mounted on a printed circuit board, a flexible printed circuit, or the like, and can be electrically connected to the gate driving circuit 120 and the data driving circuit 130 through the printed circuit board, the flexible printed circuit, or the like.

The controller 140 allows the gate driving circuit 120 to output a scan signal according to the timing implemented in each frame, and converts a data signal received from the outside to conform to the data signal format used in the data driving circuit 130 and then outputs the converted image data to the data driving circuit 130.

The controller 140 receives, from the outside (e.g., a host system), various timing signals including a vertical synchronization signal VSYNC, a horizontal synchronization signal HSYNC, an input data enable DE signal, a clock signal CLK, and the like, as well as the image data.

The controller 140 can generate various control signals using various timing signals received from the outside, and can output the control signals to the gate driving circuit 120 and the data driving circuit 130.

For example, in order to control the gate driving circuit 120, the controller 140 outputs various gate control signals GCS including a gate start pulse GSP, a gate shift clock GSC, a gate output enable signal GOE, or the like.

The gate start pulse GSP controls operation start timing of one or more gate driver integrated circuits GDIC constituting the gate driving circuit 120. The gate shift clock GSC, which is a clock signal commonly input to one or more gate driver integrated circuits GDIC, controls the shift timing of a scan signal. The gate output enable signal GOE specifies timing information on one or more gate driver integrated circuits GDIC.

In addition, in order to control the data driving circuit 130, the controller 140 outputs various data control signals DCS including a source start pulse SSP, a source sampling clock SSC, a source output enable signal SOE, or the like.

The source start pulse SSP controls a data sampling start timing of one or more source driver integrated circuits SDIC constituting the data driving circuit 130. The source sampling clock SSC is a clock signal for controlling the timing of sampling data in the respective source driver integrated circuits SDIC. The source output enable signal SOE controls the output timing of the data driving circuit 130.

The touch display device 100 can further include a power management integrated circuit (not illustrated) for supplying various voltages or currents to the display panel 110, the gate driving circuit 120, the data driving circuit 130, and the like or controlling various voltages or currents to be supplied thereto.

A liquid crystal or a light-emitting element can be disposed on each subpixel SP depending on the type of the display panel 110. In addition, an electrode which the data voltage Vdata is applied, and an electrode which a common voltage is applied or the like can be disposed on the subpixel SP.

Furthermore, the touch display device 100 can include a sensor, a line and a driving circuit or the like for sensing a touch of a user to the display panel 110.

For example, the touch display device 100 according to aspects of the present disclosure can include a plurality of touch electrode TE disposed on the active area AA, a touch driving circuit 150 driving the touch electrode TE, and a plurality of touch lines TL connecting the touch electrode TE and the touch driving circuit 150 to each other. Furthermore, the touch display device 100 can include a touch controller (not illustrated) for controlling the touch driving circuit 150 and sensing a touch based on a signal detected by the touch driving circuit 150.

The touch electrode TE, for example, can be a transparent electrode. Alternatively, the touch electrode TE can be an opaque electrode and at least a portion of the touch electrode TE can be opened.

In the case that the touch electrode TE includes an opened portion, the touch electrode TE can be a mesh shape. The opened portion of the touch electrode TE can be overlapped to a light-emitting area disposed on each subpixel SP.

A connection structure of the touch line TL and the touch electrode TE can be various according to an arrangement structure of the touch electrode TE and a touch sensing method. For example, one touch line TL can be connected to a plurality of touch electrode TE, or at least one touch line TL can be connected to each touch electrode TE.

For example, the plurality of touch electrode TE can include a plurality of touch electrode TE connected in an X-axis direction, and a plurality of touch electrode TE connected in a Y-axis direction. And the touch line TL electrically connected to the touch electrode TE connected in the X-axis direction and the touch line TL electrically connected to the touch electrode TE connected in the Y-axis direction can be disposed.

In this case, the plurality of touch electrode TE can be disposed on a same layer. some of the plurality of touch electrodes TE can be connected by a connecting line disposed on a same layer, and rest of the plurality of touch electrodes TE can be connected by a connecting line disposed on a different layer.

When a touch is sensed, a touch driving signal can be applied to the plurality of touch electrodes TE connected in the X-axis direction or the Y-axis direction, and a touch sensing signal can be detected from the plurality of touch electrodes TE connected in the X-axis direction or the Y-axis direction. In a state that different signals are applied to the touch electrode TE connected in the X-axis direction and the touch electrode TE connected in the Y-axis direction, a touch can be sensed by detecting a change of a mutual-capacitance between the touch electrodes TE occurred by the touch.

For another example, the plurality of touch electrodes TE can be disposed to be separated, and the touch line TL can be electrically connected to each touch electrode TE.

In this case, the plurality of touch electrode TE can be disposed on a same layer. The plurality of touch lines TL can be disposed on a layer different from a layer where the touch electrode TE is disposed. Each of the plurality of touch lines TL can be electrically connected to each of the plurality of touch electrodes TE. A portion of the touch line TL can be overlapped to the touch electrode TE which is not electrically connected to the touch line TL.

The touch driving signal can be supplied to the touch electrode TE through the touch line TL, and a touch can be sensed by detecting a change of a self-capacitance detected through the touch line TL.

Alternatively, in some cases, in a structure that the touch electrode TE connected in the X-axis direction and the touch electrode TE connected in the Y-axis direction are disposed, a sensing based on the mutual-capacitance and a sensing based on the self-capacitance can be performed.

The touch driving circuit 150 can output the touch driving signal to the touch electrode TE through the touch line TL, and can detect the touch sensing signal from the touch electrode TE.

The touch driving circuit 150, for example, can include an operational amplifier which is connected to the touch line TL to supply the driving signal and receive the touch sensing signal, and a feedback capacitor which accumulates charges according to a signal received by the operational amplifier. Furthermore, the touch driving circuit 150 can include an integrator processing an output signal of the operational amplifier, a sample and hold circuit and an analog-to-digital converter, or the like.

The touch driving circuit 150 can convert the touch sensing signal detected from the touch electrode TE into a digital type of sensing data, and can transmit the sensing data to the touch controller. The touch controller can detect presence or absence of a touch and a touch coordinate or the like based on the sensing data received from the touch driving circuit 150.

The touch driving circuit 150 can be disposed on the display panel 110 as a separate circuit, in some cases, can be implemented as an integrated type with the data driving circuit 130 or the like and be disposed.

As described above, according to aspects of the present disclosure, a touch of a user to the display panel 110 can be sensed by driving the touch electrode TE included in the touch display device 100. And the touch electrode TE can be disposed on the display panel 100, or can be disposed as an embedded type in the display panel 110.

Here, in the case that the touch electrode TE is disposed as the embedded type in the display panel 110, depending on types of the touch display device 100, a structure that the touch electrode TE is disposed can be different.

For example, the touch electrode TE, in the case that the touch display device 100 is a top light-emitting structure, can be disposed on an encapsulation portion protecting the light-emitting element in the display panel 110. Alternatively, the touch electrode TE, in the case that the touch display device 100 is a bottom light-emitting structure, can be disposed under the light-emitting element.

In the case that the touch electrode TE and the touch line TL are disposed inside the display panel 110, they can make a parasitic capacitance with an electrode which a voltage or a signal for a display driving is supplied.

An accuracy of a touch sensing can be dropped due to the parasitic capacitance between an electrode for the touch sensing and an electrode for the display driving. Furthermore, an abnormality of the display driving can be occurred due to the parasitic capacitance.

Figure 2:
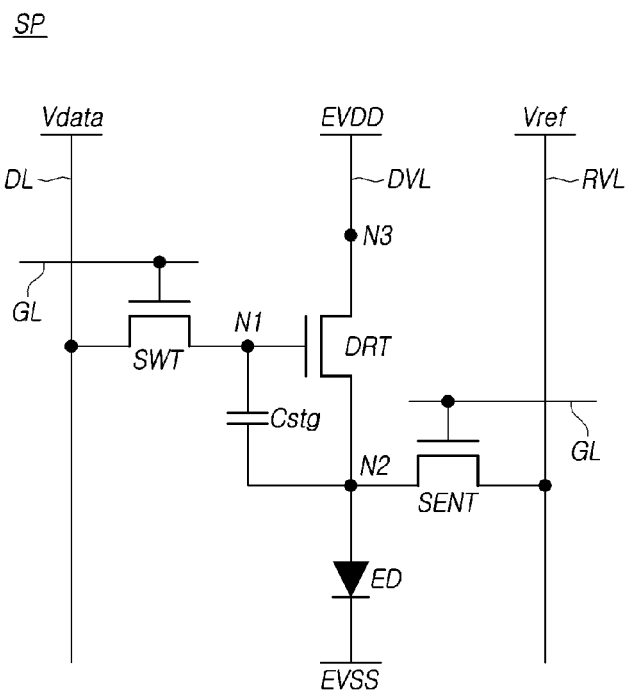
FIG. 2 is a diagram illustrating an example of a circuit structure of a subpixel included in a touch display device according to aspects of the present disclosure.

FIG. 2 is a diagram illustrating an example of a circuit structure of the subpixel SP included in the touch display device 100 according to aspects of the present disclosure.

FIG. 2 illustrates an example of a circuit structure of the subpixel SP in the case that the touch display device 100 is an organic light-emitting display device, but aspects of the present disclosure can be applied to other types of display devices.

Referring to FIG. 2, a light-emitting element ED and a driving transistor DRT for driving the light-emitting element ED can be disposed in the subpixel SP. Furthermore, at least one circuit element can be disposed in the subpixel SP other than the light-emitting element ED and the driving transistor DRT.

For example, such as the example illustrated in FIG. 2, a switching transistor SWT, a sensing transistor SENT and a storage capacitor Cstg can be further disposed in the subpixel SP.

Thus, the example illustrated in FIG. 2, illustrates a 3T1C structure that three thin film transistors and one capacitor are disposed in the subpixel SP other than the light-emitting element ED as the example, but aspects of the present disclosure aren't limited to this. Furthermore, the example illustrated in FIG. 2, illustrates a case that all thin film transistors are an N type as the example, but in some cases, the thin film transistor disposed in the subpixel SP can be a P type.

The switching transistor SWT can be electrically connected between the data line DL and a first node N1.

The data voltage Vdata can be supplied to the subpixel SP through the data line DL. The first node N1 can be a gate node of the driving transistor DRT.

The switching transistor SWT can be controlled by the scan signal supplied to the gate line GL. The switching transistor SWT can control that the data voltage Vdata supplied through the data line DL is applied to the gate node of the driving transistor DRT.

The driving transistor DRT can be electrically connected between a driving voltage line DVL and the light-emitting element ED.

A first driving voltage EVDD can be supplied to a third node N3 through the driving voltage line DVL. The first driving voltage EVDD, for example, can be a high potential driving voltage. The third node N3 can be a drain node or a source node of the driving transistor DRT.

The driving transistor DRT can be controlled by a voltage applied to the first node N1. And the driving transistor DRT can control a driving current supplied to the light-emitting element ED.

The sensing transistor SENT can be electrically connected between a reference voltage line RVL and a second node N2.

A reference voltage Vref can be supplied to the second node N2 through the reference voltage line RVL. The second node N2 can be the source node or the drain node of the driving transistor DRT.

The sensing transistor SENT can be controlled by the scan signal supplied to the gate line GL. The gate line GL controlling the sensing transistor SENT can be same as or different from the gate line GL controlling the switching transistor SWT.

The sensing transistor SENT can control that the reference voltage Vref is applied to the second node N2. Furthermore, the sensing transistor SENT, in some cases, can control to sense a voltage of the second node N2 through the reference voltage line RVL.

The storage capacitor Cstg can be electrically connected between the first node N1 and the second node N2. The storage capacitor Cstg can maintain the data voltage Vdata applied to the first node N1 during one frame.

The light-emitting element ED can be electrically connected between the second node N2 and a line supplied with a second driving voltage EVSS. The second driving voltage EVSS, for example, can be a low potential driving voltage.

When the scan signal of a turned-on level is applied to the gate line GL, the switching transistor SWT and the sensing transistor SENT can be turned-on. The data voltage Vdata can be applied to the first node N1, and the reference voltage Vref can be applied to the second node N2.

According to a difference between a voltage of the first node N1 and a voltage of the second node N2, a driving current supplied to the driving transistor DRT can be determined.

The light-emitting element ED can represent a luminance according to the driving current supplied through the driving transistor DRT.

The parasitic capacitance can be made with the touch electrode TE and the touch line TL by various signal lines and voltage lines disposed in the display panel 110. The parasitic capacitance can drop an accuracy of the touch sensing. Furthermore, an abnormality of the display driving can be occurred by the parasitic capacitance.

Aspects of the present disclosure can provide the touch display device 100 having a structure that the touch electrode TE and the touch line TL are disposed in order to minimize an influence that the parasitic capacitance between the electrode for the display driving and the electrode for the touch sensing affects the display driving and the touch sensing.

Figure 3:
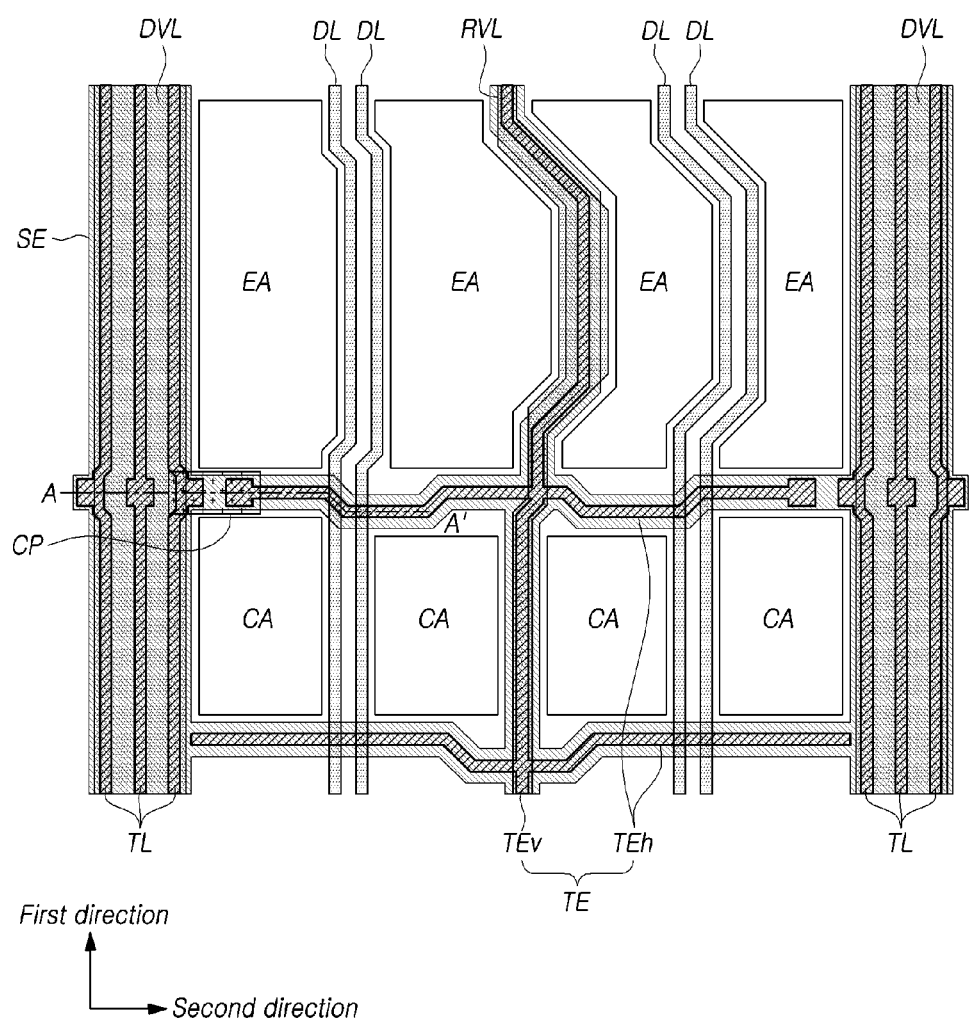
FIG. 3 is a diagram illustrating an example of a plane structure that a touch electrode and a touch line are disposed in a touch display device according to aspects of the present disclosure.
Figure 4:
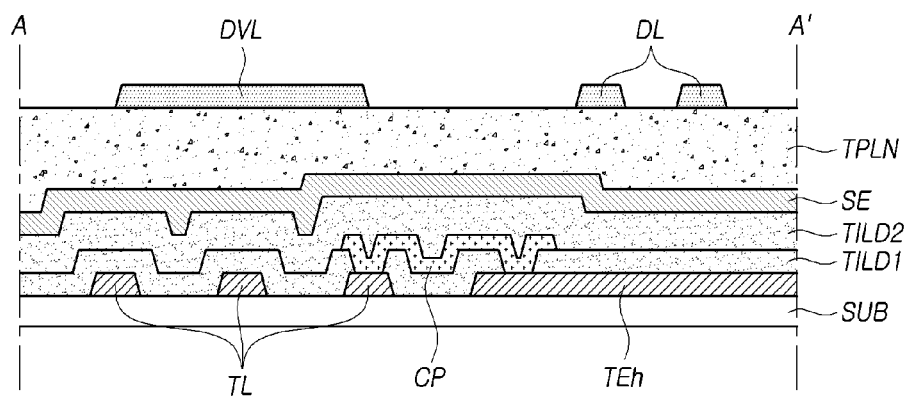
FIG. 4 is a diagram illustrating an example of a cross-sectional structure, taken along line A-A' in FIG. 3.

FIG. 3 is a diagram illustrating an example of a plane structure that the touch electrode TE and the touch line TL are disposed in the touch display device 100 according to aspects of the present disclosure. FIG. 4 is a diagram illustrating an example of a cross-sectional structure, taken along line A-A' in FIG. 3.

FIGS. 3 and 4 illustrate the example of a structure that the touch electrode TE and the touch line TL are disposed in the case that the touch display device 100 is the bottom light-emitting structure, but aspects of the present disclosure can be applied to other types of the touch display device 100 also.

Referring to FIG. 3, each subpixel SP can include a light-emitting area EA where the light-emitting element ED is disposed and a circuit area CA where the circuit element driving the light-emitting element ED is disposed.

As lines supplying voltages to each subpixel SP, the driving voltage line DVL, the reference voltage line RVL and the data line DL can be disposed.

The driving voltage line DVL can supply the first driving voltage EVDD to at least two subpixels SP located on both sides of the driving voltage line DVL. The reference voltage line RVL can supply the reference voltage Vref to at least two subpixels SP located on both sides of the reference voltage line RVL.

The data line DL can supply the data voltage Vdata to each subpixel SP.

Although not illustrated in FIG. 3, the gate line GL can be disposed in a direction crossing the driving voltage line DVL, the reference voltage line RVL and the data line DL.

The touch electrode TE and the touch line TL for the touch sensing can be disposed on a location not preventing a display of an image according to the display driving. The touch electrode TE and the touch line TL can be disposed on a same layer, or can be disposed on different layers. In the case that the touch electrode TE and the touch line TL are disposed on different layers, the touch electrode TE and the touch line TL can be electrically connected through a contact-hole CH.

Furthermore, the touch electrode TE and the touch line TL can be disposed on a location to be capable of minimizing an influence by the parasitic capacitance made by the electrode for the display driving.

For example, the touch electrode TE and the touch line TL can be disposed not to be overlapped with the light-emitting area EA included in the subpixel SP. The touch electrode TE can be a mesh type, and can be a shape including a plurality of opened portions located on areas corresponding to the light-emitting area EA.

The touch electrode TE and the touch line can be located on an area overlapped with a line supplied with a direct current voltage among lines that a voltage or a signal for the display driving is supplied.

For example, at least some of the touch electrode TE and the touch line TL can be located to be overlapped with the driving voltage line DVL supplied with the first driving voltage EVDD. At least some of the touch electrode TE and the touch line TL can be located to be overlapped with the reference voltage line RVL supplied with the reference voltage Vref.

At least one of the touch electrode TE and the touch line TL can be located not to be overlapped with the data line DL supplied with the data voltage Vdata. Alternatively, at least a portion of the touch electrode TE and the touch line TL can be located not to be overlapped with the data line DL.

As the touch electrode TE and the touch line TL are located on an area avoiding the light-emitting area EA, it can be prevented that dispositions of the touch electrode TE and the touch line TL affect an influence an image display.

As the touch electrode TE and the touch line TL is located to be overlapped with a display electrode supplied with the direct current voltage, it can be prevented that a signal of the touch electrode TE or the touch line TL is fluctuated according to a signal applied for the display driving and a performance of the touch sensing is dropped.

Furthermore, the touch electrode TE and the touch line TL can be disposed on a location where an influence that a signal supplied to the touch line TL affect the display driving can be minimized.

For example, the touch electrode TE can be located on an area overlapping with the reference voltage line RVL. The touch electrode TE can include at least one vertical sensor portion TEv disposed in a first direction. The touch electrode TE can include a plurality of horizontal sensor portion TEh disposed in a second direction and connected to the vertical sensor portion TEv. The vertical sensor portion TEv of the touch electrode TE can be located on an area overlapping with the reference voltage line RVL. And in the present disclosure, a verticality and a horizontality can be relative concept, they aren't construed to be limited as specific directions. Furthermore, the verticality and the horizontality can mean crossing directions, but it doesn't mean crossing orthogonally. For example, one of the verticality and the horizontality can mean a direction that any one line (e.g., the data line) among display signal lines is disposed, and another can mean a direction crossing the direction that any one line (e.g., the data line) among the display signal lines is disposed.

The touch line TL can be located on an area overlapping with the driving voltage line DVL. The touch line TL can be disposed not to be located on an area overlapping with the reference voltage line RVL.

The reference voltage Vref supplied through the reference voltage line RVL can a lower voltage than the first driving voltage EVDD supplied through the driving voltage line DVL.

In a case that the touch line TL is located on an area overlapped with the reference voltage line RVL, a voltage level of the reference voltage line RVL can be fluctuated by a signal of a pulse type supplied through the touch line TL. When the voltage level of the reference voltage line RVL is fluctuated, it can affect a display quality.

Thus, by disposing the touch line TL on an area overlapped with the driving voltage line DVL, an electrode structure for the touch sensing can be made while preventing that the electrode for the touch sensing and the electrode for the display driving affect each other.

Furthermore, in order to minimize the parasitic capacitance between the electrode for the touch sensing and the electrode for the display driving, an electrode capable of blocking a formation of the parasitic capacitance between the electrode for the touch sensing and the electrode for the display driving can be disposed.

Referring to FIGS. 3 and 4, the touch line TL and the touch electrode TE can be disposed on a substrate SUB. FIG. 4 illustrates the example of a cross-sectional structure of a portion that the horizontal sensor portion TEh of the touch electrode TE is disposed.

A first touch insulating layer TILD1 can be disposed on the touch line TL and the touch electrode TE.

A connecting pattern CP electrically connecting between the touch line TL and the touch electrode TE can be disposed on the first touch insulating layer TILD1.

A second touch insulating layer TILD2 can be disposed on the connecting pattern CP.

A shield electrode SE can be disposed on the second touch insulating layer TILD2.

The shield electrode SE can be disposed on an area overlapped with at least a portion of the touch line TL and the touch electrode TE.

A touch planarization layer TPLN can be disposed on the shield electrode SE.

A signal line for the display driving such as the driving voltage line DVL and the data line DL can be disposed on the touch planarization layer TPLN. In some cases, at least one insulating layer can be further disposed between the touch planarization layer TPLN and the signal line for the display driving.

As the shield electrode SE is disposed between the electrode for the touch sensing and the electrode for the display driving, it can be prevented that a direct coupling is occurred between the electrode for the touch sensing and the electrode for the display driving.

Thus, it can be prevented that a signal supplied to the signal line for the display driving is fluctuated by a signal supplied to the touch line TL. Furthermore, it can be prevented that the touch sensing signal detected through the touch line TL is fluctuated by a signal supplied to the data line DL.

The shield electrode SE can be supplied with a constant signal for performing a noise blocking stably. The shield electrode SE can be supplied with a signal different from a signal supplied to the touch electrode TE and the touch line TL. For example, the shield electrode SE can be supplied with a direct current voltage.

The parasitic capacitance which can be made between the electrode for the touch sensing and the electrode for the display driving can be reduced by the shield electrode SE, the performance of the touch sensing can be improved, and the abnormality of the display driving can be prevented.

Furthermore, aspects of the present disclosure can provide methods capable of minimizing an influence between the electrode for the touch sensing and the electrode for the display driving by reducing an indirect coupling through the shield electrode SE.

Figure 5:
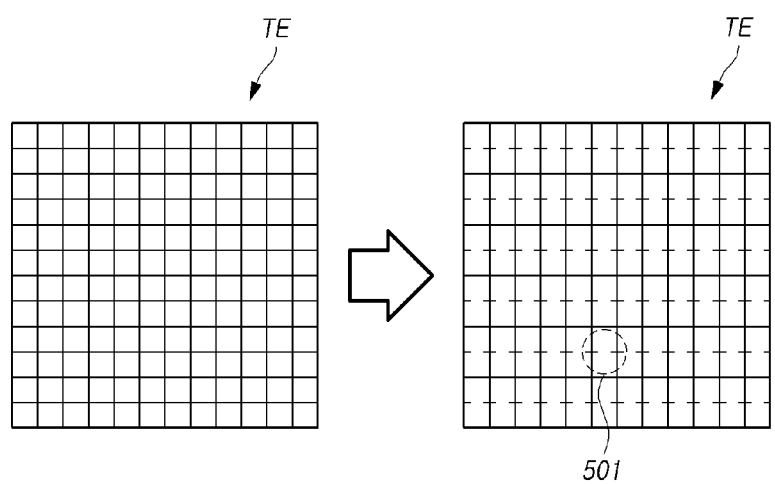
FIG. 5 is a diagram illustrating an example of other structure of a touch electrode disposed in a touch display device according to aspects of the present disclosure.

FIG. 5 is a diagram illustrating an example of other structure of the touch electrode TE disposed in the touch display device 100 according to aspects of the present disclosure.

Referring to FIG. 5, the touch electrode TE such as the example described above can be a mesh shape that includes the vertical sensor portion TEv and the horizontal sensor portion TEh.

In this case, one of the vertical sensor portion TEv or the horizontal sensor portion TEh can be disposed in a direction crossing a signal line for the display driving. For example, the horizontal sensor portion TEh of the touch electrode TE can be disposed to cross the data line DL.

A portion of the horizontal sensor portion TEh of the touch electrode TE can be removed on an area crossing the data line DL. Another portion of the horizontal sensor portion TEh of the touch electrode TE can maintain a state disposed on an area crossing the data line DL for an electrical connection of the touch electrode TE.

As the horizontal sensor portion TEh of the touch electrode TE is removed on a part area of an area overlapped with the data line DL, a coupling between the data line DL and the touch electrode TE can be reduced.

Furthermore, the shield electrode SE may not be disposed on an area where a portion of the horizontal sensor portion TEh of the touch electrode TE is removed.

Among areas overlapped with the data line DL, the horizontal sensor portion TEh of the touch electrode TE and the shield electrode SE can be disposed on some areas, and the horizontal sensor portion TEh of the touch electrode TE and the shield electrode SE may not be disposed on other some areas.

While maintaining a shape for an electrical connection of the touch electrode TE and a function of a noise blocking by the shield electrode SE, the coupling between the touch electrode TE and the data line DL can be reduced, thus the performance of the touch sensing can be improved and it can be prevented that the abnormality of the display driving occurs.

Figure 6:
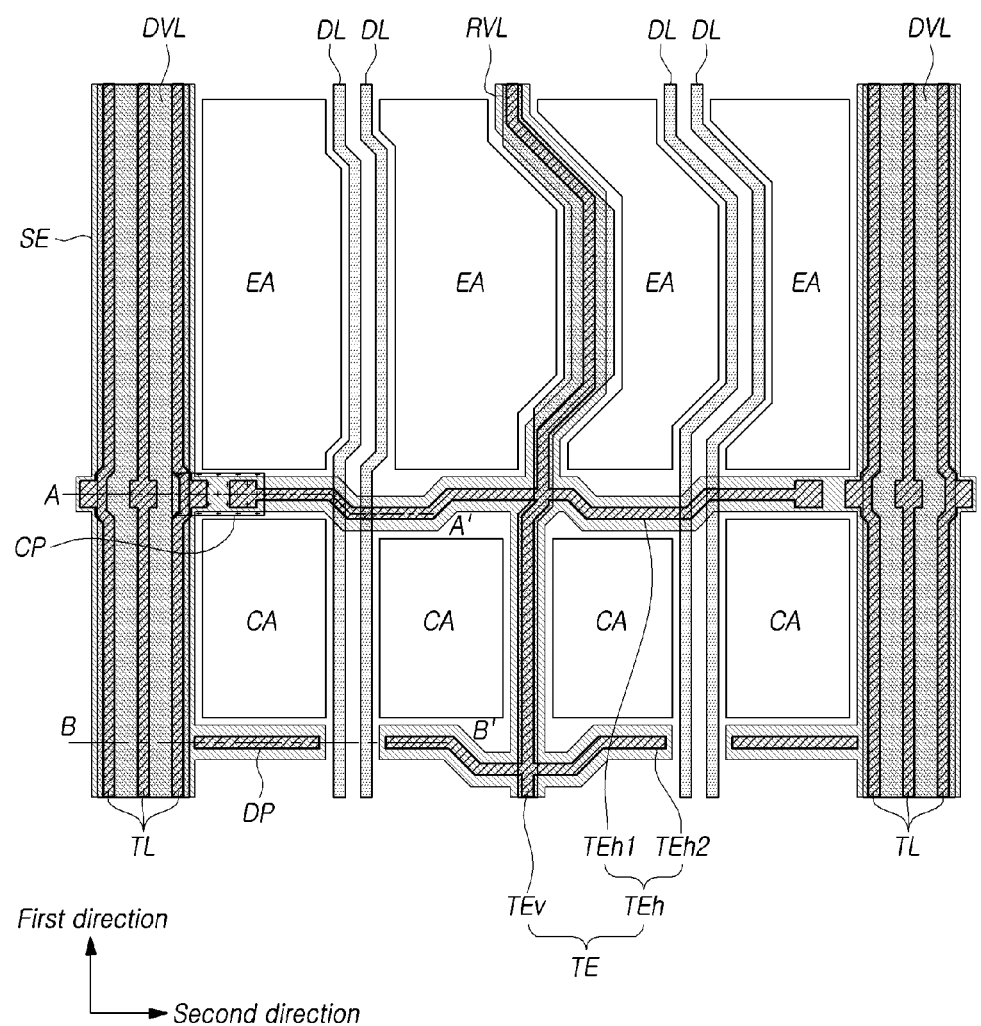
FIG. 6 is a diagram illustrating another example of a plane structure that a touch electrode and a touch line are disposed in a touch display device according to aspects of the present disclosure.
Figure 7:
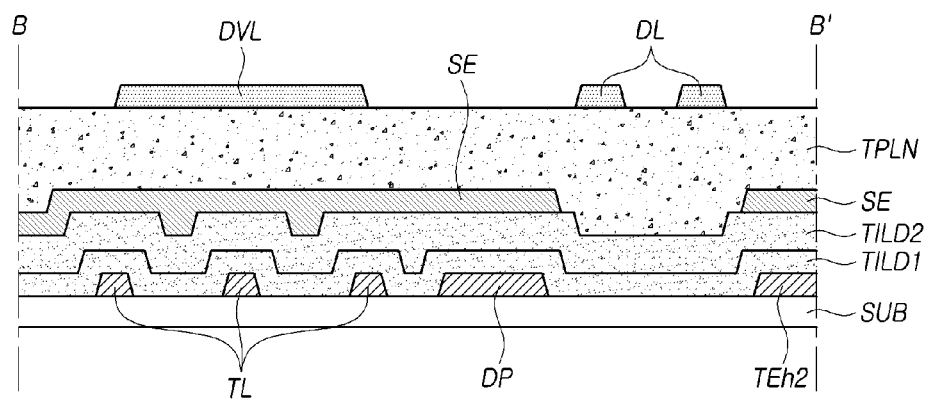
FIG. 7 is a diagram illustrating an example of a cross-sectional structure, taken along line B-B' in FIG. 6.

FIG. 6 is a diagram illustrating another example of a plane structure that the touch electrode TE and the touch line TL are disposed in the touch display device 100 according to aspects of the present disclosure. FIG. 7 is a diagram illustrating an example of a cross-sectional structure, taken along line B-B' in FIG. 6.

Referring to FIG. 6, the touch electrode TE and the touch line TL can be disposed to avoid the light-emitting area EA of the subpixel SP.

The touch electrode TE can include the vertical sensor portion TEv and the horizontal sensor portion TEh. The vertical sensor portion TEv of the touch electrode TE can be disposed on an area overlapping with the reference voltage line RVL.

The touch line TL can be disposed on an area overlapping with the driving voltage line DVL.

The touch electrode TE and the touch line TL can be electrically connected by the connecting pattern CP. The connecting pattern CP can be disposed on a different layer from a layer where the touch electrode TE and the touch line TL are disposed.

The horizontal sensor portion TEh of the touch electrode TE can include a first horizontal sensor portion TEh1 and a second horizontal sensor portion TEh2.

A length of the first horizontal sensor portion TEh1 can be greater than a length of the second horizontal sensor portion TEh2.

A portion of the first horizontal sensor portion TEh1 can overlap with the data line DL. The first horizontal sensor portion TEh1 can be electrically connected to the touch line TL through the connecting pattern CP.

The second horizontal sensor portion TEh2 can be disposed on an area other than an area overlapped with the data line DL. Thus, the second horizontal sensor portion TEh2 may not overlap with the data line DL.

The second horizontal sensor portion TEh2 can be located on an area between the vertical sensor portion TEv and the data line DL.

A dummy pattern DP can be located between the second horizontal sensor portion TEh2 and the touch line TL.

The dummy pattern DP can be disposed on an area between the data line DL and the touch line TL. The dummy pattern DP may not overlap with the data line DL.

The dummy pattern DP can be disposed on a same layer as a layer where the touch electrode TE and the touch line TL are disposed. The dummy pattern DP can be disposed between the data line DL and the touch line TL, in a process that the second horizontal sensor portion TEh2 is disposed not to overlap with the data line DL.

The dummy pattern DP may not be connected to the touch electrode TE and the touch line TL. The dummy pattern DP can be floated that no specific signal is applied.

A cross-sectional structure of a portion A-A' illustrated in FIG. 6 can be same as a cross-sectional structure of a portion A-A' illustrated in FIG. 3.

The first horizontal sensor portion TEh1 can be disposed to cross the data line DL for an electrical connection between the touch electrode TE and the touch line TL in a portion A-A' illustrated in FIG. 6. The shield electrode SE can be disposed to overlap with the first horizontal sensor portion TEh1 on a layer between a layer where the first horizontal sensor portion TEh1 is disposed and a layer where the data line DL is disposed.

The second horizontal sensor portion TEh2 may not be disposed on an area overlapped with the data line DL for reducing the coupling between the touch electrode TE and the data line DL in a portion B-B' illustrated in FIG. 6. Furthermore, the shield electrode SE may not be disposed on an area overlapped with the data line DL.

Referring to FIGS. 6 and 7, the touch line TL, the dummy pattern DP and the second horizontal sensor portion TEh2 of the touch electrode TE can be disposed on the substrate SUB.

The first touch insulating layer TILD1 and the second touch insulating layer TILD2 can be disposed sequentially.

The shield electrode SE can be disposed on the second touch insulating layer TILD2.

The driving voltage line DVL and the data line DL can be disposed on the touch planarization layer TPLN disposed on the shield electrode SE.

The touch electrode TE or the touch line TL may not be disposed on an area overlapped with the data line DL. Thus, a crosstalk can be prevented due to a direct coupling between the data line DL and the touch electrode TE.

Furthermore, the shield electrode SE may not be disposed on an area overlapped with the data line DL. Thus, it can be prevented that a crosstalk between a signal for the touch sensing and a signal for the display driving occurs due to an indirect coupling through the shield electrode SE.

Furthermore, aspects of the present disclosure can provide methods capable of preventing a crosstalk between the touch sensing signal and the display driving signal by cutting structure between the touch electrode TE and the shield electrode SE without adding a separate layer for a disposition of the shield electrode SE.

Figure 8A:
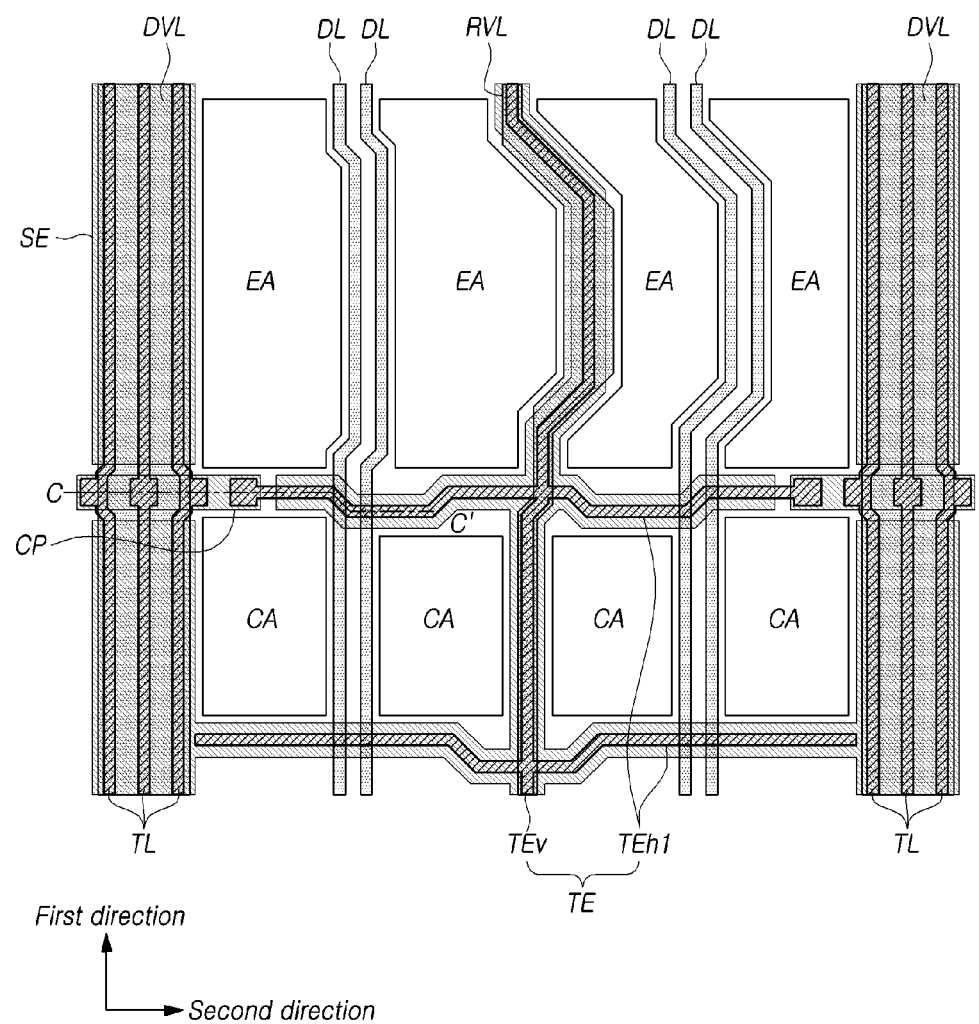
FIGS. 8A and 8B are diagrams illustrating other examples of a plane structure that a touch electrode and a touch line are disposed in a touch display device according to aspects of the present disclosure.
Figure 8B:
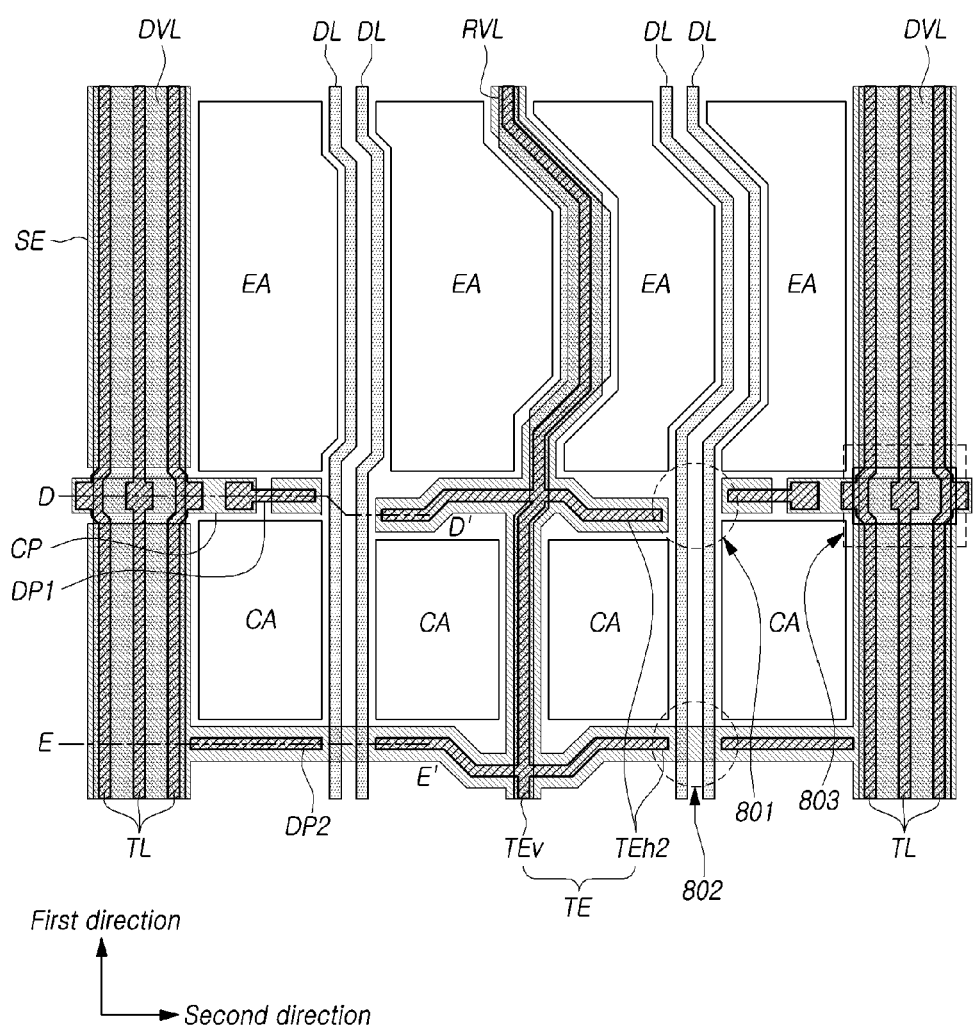
Figure 9:
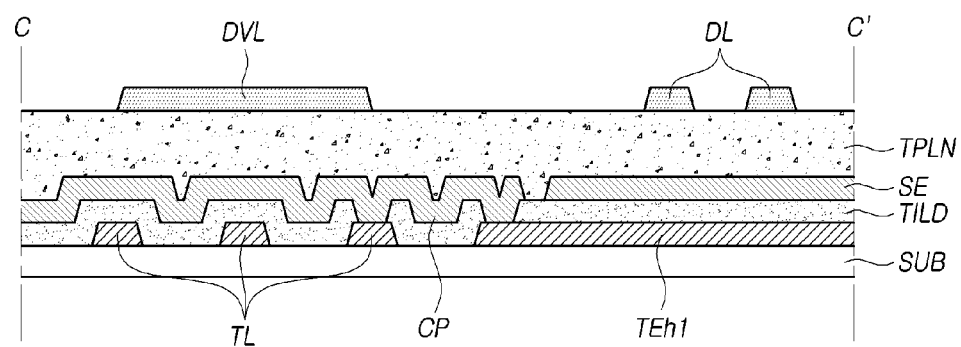
FIG. 9 is a diagram illustrating an example of a cross-sectional structure, taken along line C-C' in FIG. 8A.
Figure 10:
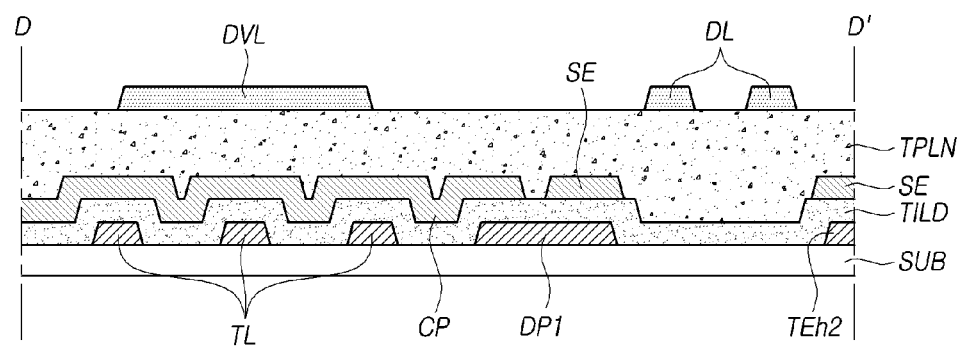
FIG. 10 is a diagram illustrating an example of a cross-sectional structure, taken along line D-D' in FIG. 8B.
Figure 11:
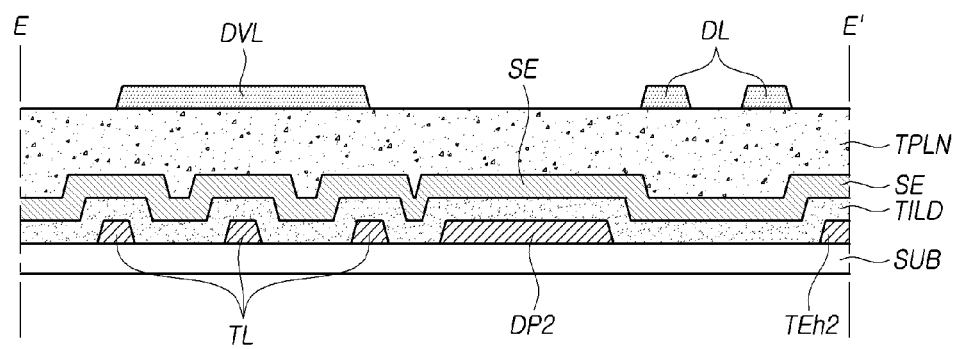
FIG. 11 is a diagram illustrating an example of a cross-sectional structure, taken along line E-E' in FIG. 8B.

FIGS. 8A and 8B are diagrams illustrating other examples of a plane structure that the touch electrode TE and the touch line TL are disposed in the touch display device 100 according to aspects of the present disclosure. FIG. 9 is a diagram illustrating an example of a cross-sectional structure, taken along line C-C' in FIG. 8A. FIG. 10 is a diagram illustrating an example of a cross-sectional structure, taken along line D-D' in FIG. 8B. FIG. 11 is a diagram illustrating an example of a cross-sectional structure, taken along line E-E' in FIG. 8B.

Referring to FIG. 8A, the touch electrode TE can include at least one vertical sensor portion TEv disposed in the first direction. The vertical sensor portion TEv of the touch electrode TE can be disposed on an area overlapped with the reference voltage line RVL.

The touch electrode TE can include the plurality of horizontal sensor portions TEh disposed in the second direction crossing the first direction. The plurality of horizontal sensor portions TEh can be connected to the vertical sensor portion TEv.

The plurality of horizontal sensor portions TEh can include the first horizontal sensor portion TEh1, and the second horizontal sensor portion TEh2 shorter than the first horizontal sensor portion TEh1, and FIG. 8A illustrates the example of a portion that the first horizontal sensor portion TEh1 is disposed.

The touch line TL can be disposed on a same layer as a layer where the touch electrode TE is disposed. The touch line TL can be disposed on an area overlapped with the driving voltage line DVL.

The touch line TL can be electrically connected to the first horizontal sensor portion TEh1 of the touch electrode TE through the connecting pattern CP.

The connecting pattern CP can be disposed on a different layer from a layer where the touch electrode TE and the touch line TL are disposed.

The shield electrode SE can be disposed on a same layer as a layer where the connecting pattern CP is disposed.

The shield electrode SE can be disposed on at least a part area of an area overlapped with the touch electrode TE and the touch line TL. The shield electrode SE can be disposed on an area other than an area where the connecting pattern CP is disposed. The shield electrode SE can be disposed to be separated from the connecting pattern CP.

Referring to FIG. 9, the touch line TL and the first horizontal sensor portion TEh1 of the touch electrode TE can be disposed on the substrate SUB.

The touch insulating layer TILD can be disposed on the touch line TL and the touch electrode TE.

The connecting pattern CP and the shield electrode SE can be disposed on the touch insulating layer TILD.

The touch planarization layer TPLN and the data line DL or the like can be disposed on the connecting pattern CP and the shield electrode SE.

As the shield electrode SE is disposed on a layer where the connecting pattern CP is disposed, a separate layer may not be added due to a disposition of the shield electrode SE.

The shield electrode SE can be disposed on at least a part area of an area overlapped with the touch electrode TE and the touch line TL, and can be located between the data line DL and the touch electrode TE.

Thus, it can be prevented that a degeneration of the performance of the touch sensing and the abnormality of the display driving occur by the direct coupling between the data line DL and the touch electrode TE.

Such as described above, by disposing the shield electrode SE using a layer where the connecting pattern CP is disposed, a structure capable of improving the performance of the touch sensing can be implemented while reducing the number of layers required for dispositions of the electrode for the touch sensing.

Furthermore, by removing the touch electrode TE located on at least a part area of an area overlapped with the data line DL, the coupling between the data line DL and the touch electrode TE can be reduced more.

In this case, the shield electrode SE can be removed on some areas among areas where the touch electrode TE is removed. Furthermore, the shield electrode SE can maintain a state disposed on other some areas among areas where the touch electrode TE is removed.

Referring to FIG. 8B, the touch electrode TE can include at least one vertical sensor portion TEv and the plurality of horizontal sensor portions TEh.

The plurality of horizontal sensor portions TEh can include the first horizontal sensor portion TEh1 and the second horizontal sensor portion TEh2 shorter than the first horizontal senor portion TEh1. FIG. 8B illustrates the example of a portion that the second horizontal sensor portion TEh2 is disposed.

The second horizontal sensor portion TEh2 of the touch electrode TE can be disposed on an area other than an area overlapped with the data line DL. The second horizontal sensor portion TEh2 can be disposed on an area between the vertical sensor portion TEv and the data line DL.

As the second horizontal sensor portion TEh2 of the touch electrode TE is not disposed on an area overlapped with the data line DL, the dummy pattern DP can be disposed between the second horizontal sensor portion TEh2 and the touch line TL. The dummy pattern DP can be located on an area between the data line DL and the touch line TL.

Referring to FIGS. 8B and 10, the connecting pattern CP and the shield electrode SE can be located on a first dummy pattern DP1.

Referring to FIGS. 8B and 11, the shield electrode SE can be located on a second dummy pattern DP2, and the connecting pattern CP may not be located on the second dummy pattern DP2.

The first dummy pattern DP1 and the second dummy pattern DP2 may not be connected to the touch electrode TE and the touch line TL. Alternatively, in some cases, the first dummy pattern DP1 can be electrically connected to the touch line TL through the connecting pattern CP.

As the second horizontal sensor portion TEh2 of the touch electrode TE is not disposed on an area overlapped with the data line DL, the shield electrode SE located on an area overlapped with the data line DL can be removed. Alternatively, the shield electrode SE can be disposed on some areas among areas overlapped with the data line DL.

Referring to FIGS. 8B and 10, the shield electrode SE can be disposed on the first dummy pattern DP1 and the second horizontal sensor portion TEh2 of the touch electrode TE.

The shield electrode SE, such as a portion indicated by 801, may not be disposed on an area overlapped with the data line DL.

Thus, it can be prevented that a signal supplied to the data line DL affects a signal applied to the touch electrode TE indirectly by a coupling between the data line DL and the shield electrode SE.

Furthermore, the shield electrode SE can be disposed on some areas which is overlapped with the data line DL and the touch electrode TE is not disposed.

Referring to FIGS. 8B and 11, the shield electrode SE can be disposed on the touch line TL since an area on the touch line TL is an area where the connecting pattern CP is not disposed.

The shield electrode SE can be disposed on the second dummy pattern DP2 and the second horizontal sensor portion TEh2 of the touch electrode TE.

The shield electrode SE, such as a portion indicated by 802, can be disposed to be overlapped with the data line DL on an area between the second dummy pattern DP2 and the touch electrode TE.

In a case that the shield electrode SE is disposed by using a layer where the connecting pattern CP is disposed, such as a portion indicated by 803, the shield electrode SE may not be disposed on an area where the connecting pattern CP is disposed.

By disposing the shield electrode SE on some areas where is overlapped with the data line DL and the touch electrode TE is removed, a degeneration of a performance of the noise blocking can be prevented due to a reduction of a disposition area of the shield electrode SE.

Furthermore, an increase of an area of the shield electrode SE floated according to cutting the shield electrode SE in some areas can be prevented.

Figure 12:
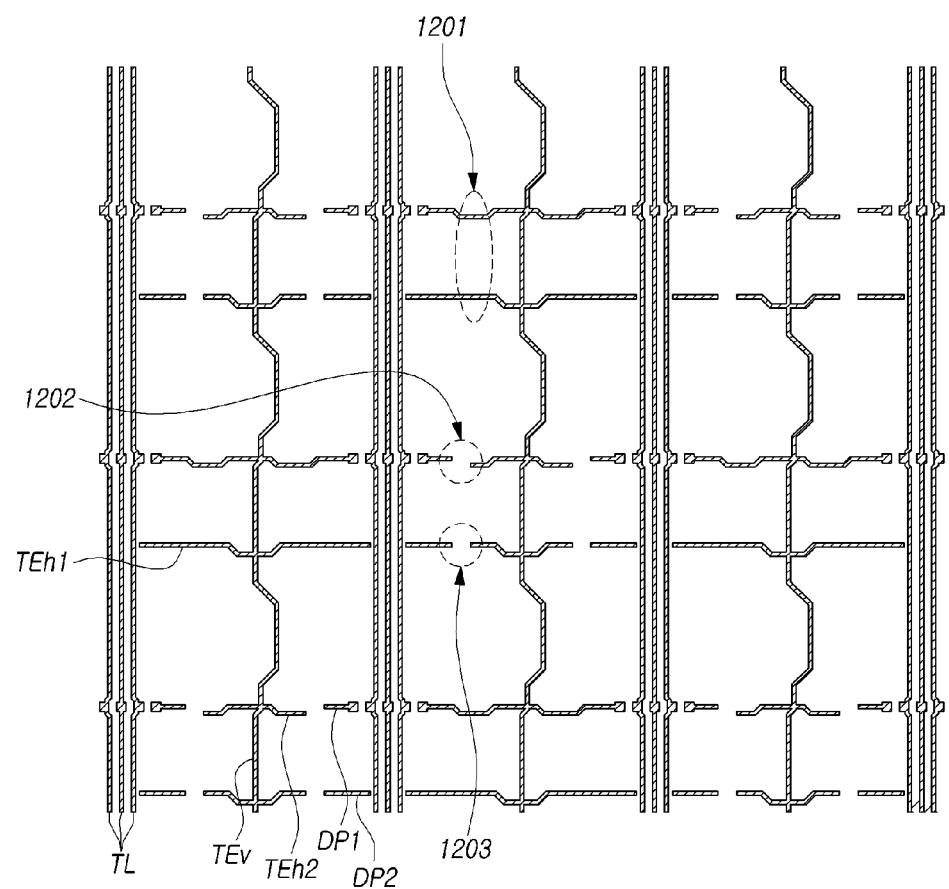
FIG. 12 is a diagram illustrating an example of a structure that the touch electrode and the touch line according to the example illustrated in FIGS. 8A and 8B are disposed on two or more pixel areas.
Figure 13:
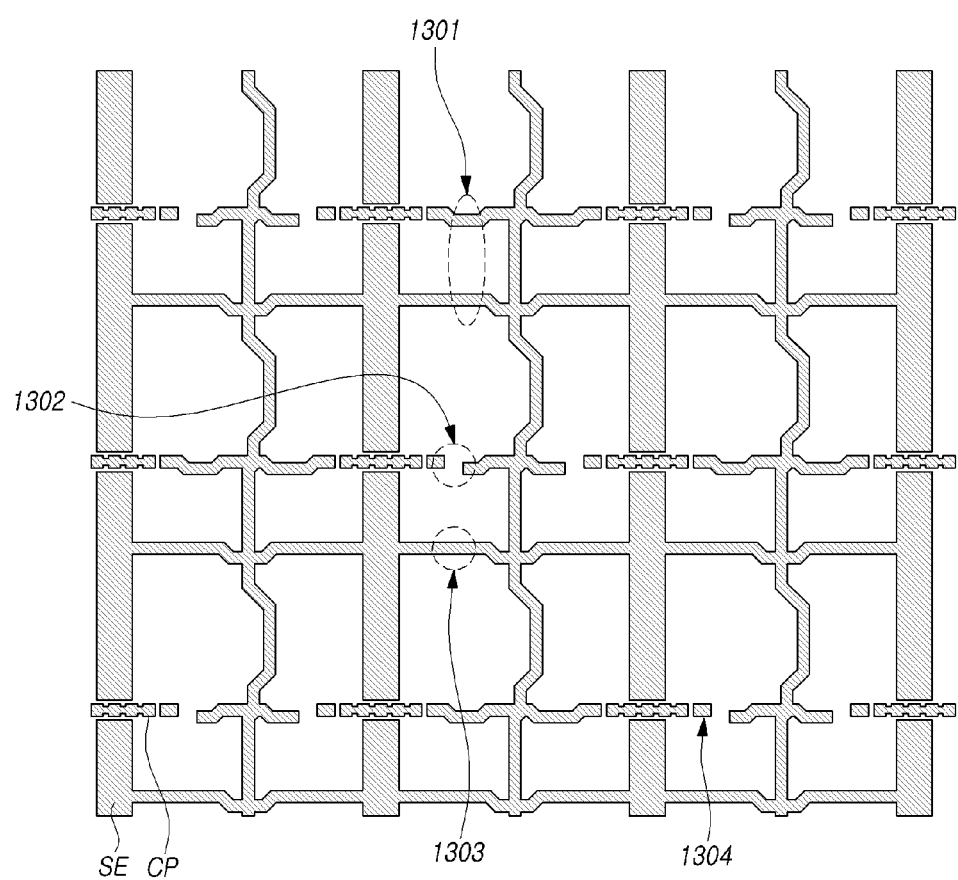
FIG. 13 is a diagram illustrating an example of a structure that a shield electrode is disposed on two or more pixel areas according to the example illustrated in FIGS. 8A and 8B.

FIG. 12 is a diagram illustrating an example of a structure that the touch electrode TE and the touch line TL according to the example illustrated in FIGS. 8A and 8B are disposed on two or more pixel areas. FIG. 13 is a diagram illustrating an example of a structure that the shield electrode SE is disposed on two or more pixel areas according to the example illustrated in FIGS. 8A and 8B.

FIGS. 12 and 13 illustrate examples of a plane structure where the touch electrode TE, the touch line TL and the shield electrode SE are disposed on nine pixel areas.

Referring to FIG. 12, the touch electrode TE and the touch line TL can be disposed on a same layer.

The touch electrode TE can include the vertical sensor portion TEv and the horizontal sensor portion TEh. The horizontal sensor portion TEh can include the first horizontal sensor portion TEh1 and the second horizontal sensor portion TEh2

FIG. 12 illustrates the example of a structure that a pixel area where the first horizontal sensor portion TEh1 is disposed and a pixel area where the second horizontal sensor portion TEh2 alternate. In some cases, the pixel area where the first horizontal sensor portion TEh1 is disposed can be located on a same row. And it can be a structure that the first horizontal sensor portions TEh1 disposed in adjacent pixel areas are electrically connected to each other.

The second horizontal sensor portion TEh2 may not be disposed on an area overlapped with the data line DL. As the horizontal sensor portion TEh2 is cut not to be disposed on an area overlapped with the data line DL, the first dummy pattern DP1 and the second dummy pattern DP2 can be disposed.

Referring to FIG. 13, the connecting pattern CP and the shield electrode SE can be disposed on a same layer.

The connecting pattern CP can be disposed on the touch line TL and the first horizontal sensor portion TEh1 of the touch electrode TE. The connecting pattern CP can be disposed on the touch line TL and the first dummy pattern DP1.

The shield electrode SE can be disposed on an area other than an area where the connecting pattern CP is disposed.

The shield electrode SE can be disposed on an area overlapped with at least a portion of the touch electrode TE and the touch line TL. The shield electrode SE may not be disposed on an area where the touch electrode TE is not disposed.

The shield electrode SE can be disposed on some areas of areas where the touch electrode TE is not disposed and overlapped with the data line DL.

Referring to FIGS. 12 and 13, the shield electrode SE can be disposed such as a portion indicated by 1301 in FIG. 13 on an area where the first horizontal sensor portion TEh1 of the touch electrode TE is disposed such as a portion indicated by 1201 in FIG. 12.

The shield electrode SE can prevent a direct or an indirect coupling between the touch electrode TE and the data line DL.

The shield electrode SE may not be disposed such as a portion indicated by 1302 in FIG. 13 on an area adjacent to the second horizontal sensor portion TEh2 of the touch electrode TE such as a portion indicated by 1202 in FIG. 12.

As the second horizontal sensor portion TEh2 of the touch electrode TE doesn't overlap with the data line DL, the parasitic capacitance between the touch electrode TE and the data line DL can be reduced. Furthermore, as the shield electrode SE is not disposed on an area overlapped with the data line DL, the indirect coupling through the shield electrode SE can be reduced.

The shield electrode SE can be disposed such as a portion indicated by 1303 in FIG. 13 on area adjacent to the second horizontal sensor portion TEh2 of the touch electrode TE such as a portion indicated by 1203 in FIG. 12.

Thus, in the case that the shield electrode SE is disposed by using a layer where the connecting pattern CP is disposed, a degeneration of the performance of the noise blocking due to a reduction of an area where the shield electrode SE is disposed can be prevented.

Furthermore, it can be prevented that an area of the shield electrode SE floated increases by a cutting structure of the shield electrode SE.

For example, as the shield electrode SE is removed on some areas among areas overlapped with the data line DL, the shield electrode SE floated can be present such as a portion indicated by 1304. This shield electrode SE can be located on the first dummy pattern DP1.

In a case that the shield electrode SE is not disposed on a portion indicated by 1303, the shield electrode SE located between the connecting patterns CP can be floated. But, by maintaining a disposition of the shield electrode SE such as a portion indicated by 1303, it can be prevented that an area of the shield electrode SE floated increases.

Thus, while preventing a reduction of an area of the shield electrode SE supplied with a signal for blocking a coupling, a function of the noise blocking by the shield electrode SE can be performed stably.

Figure 14:
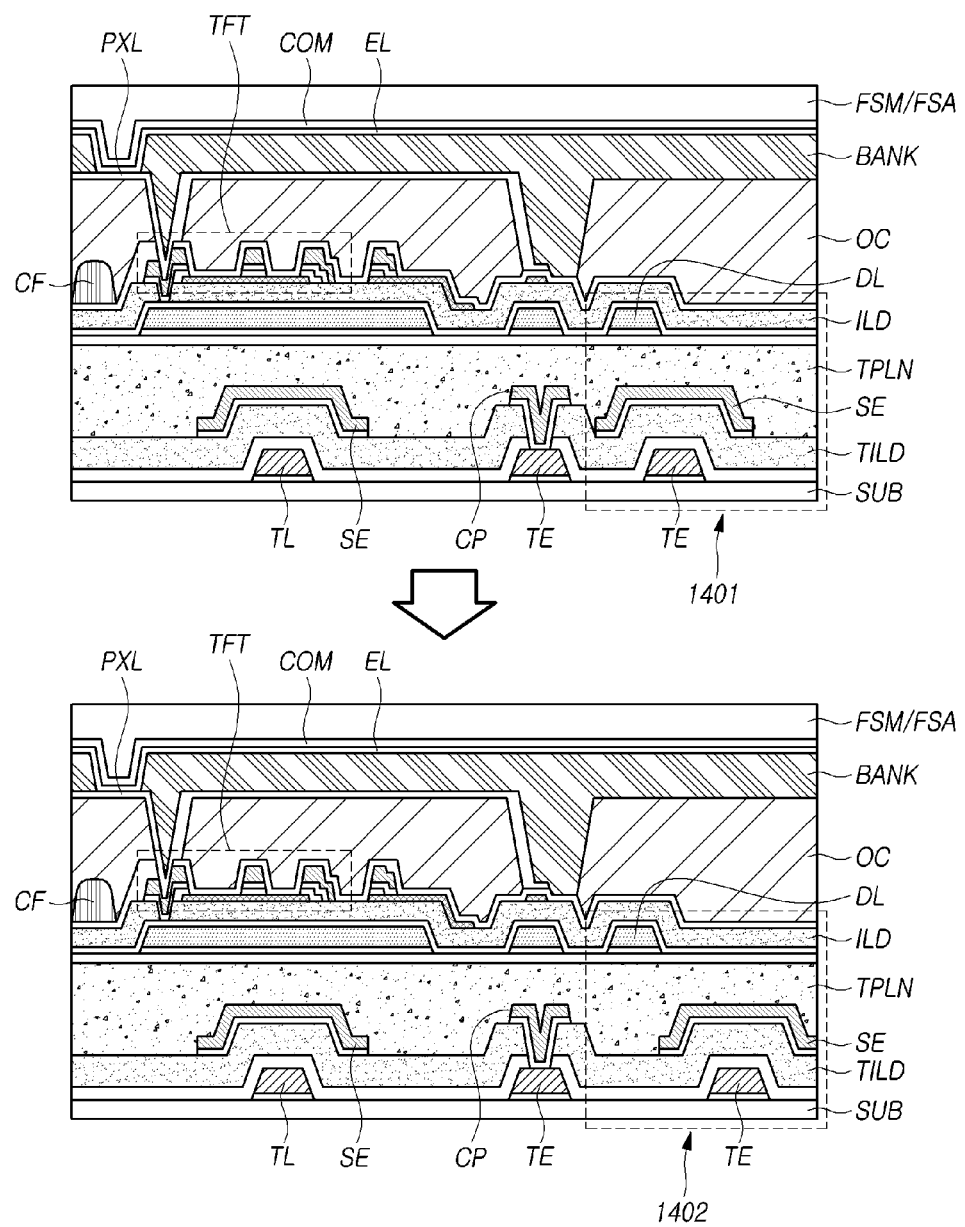
FIG. 14 is a diagram illustrating an example of an entire cross-sectional structure of a touch display device according to a structure that a touch electrode is disposed in the touch display device according to aspects of the present disclosure.

FIG. 14 is a diagram illustrating an example of an entire cross-sectional structure of the touch display device 100 according to a structure that the touch electrode TE is disposed in the touch display device 100 according to aspects of the present disclosure.

Each electrode layer illustrated in FIG. 14, in some cases, can be constituted as a plurality of layers. Furthermore, two or more insulating layers can be disposed between each of electrode layers illustrated in FIG. 14.

Referring to FIG. 14, the touch line TL and the touch electrode TE can be disposed on the substrate SUB. The connecting pattern CP and the shield electrode SE can be located over a layer where the touch line TL and the touch electrode TE are disposed.

The signal line and the circuit element for the display driving can be disposed on the touch planarization layer TPLN.

For example, the data line DL and a thin film transistor TFT can be disposed. An overcoat layer OC can be disposed on the thin film transistor TFT. The light-emitting element ED including a pixel electrode PXL, a light-emitting layer EL and a common electrode COM can be disposed on the overcoat layer OC.

As illustrating the example of the bottom light-emitting structure, a color filter layer CF can be disposed under the overcoat layer OC.

A bank layer BANK can be disposes on the overcoat layer OC.

A surface adhesive film FSA and a metal encapsulation substrate FSM can be disposed on the common electrode COM included in the light-emitting element ED.

As the touch electrode TE is disposed as a mesh shape, a portion of the touch electrode TE and a portion of the shield electrode SE can be overlapped with the data line DL such as a portion indicated by 1401.

Such as aspects of the present disclosure described above, as the touch electrode TE and the shield electrode SE are not disposed on some areas of areas overlapped with the data line DL, a portion of the touch electrode TE and the shield electrode SE may not be overlapped with the data line DL such as a portion indicated by 1402.

Thus, it can be prevented that the touch sensing and the display driving affect each other by the direct coupling between the touch electrode TE and the data line DL or the indirect coupling through the shield electrode SE.

Figure 15:
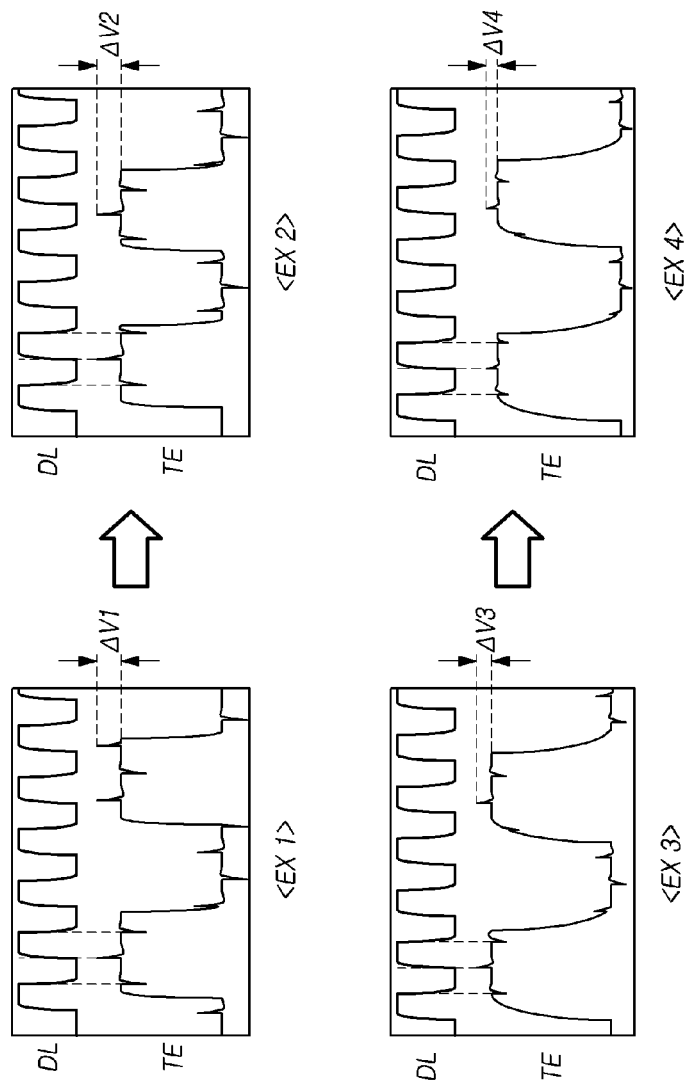
FIG. 15 is a diagram illustrating an example of a crosstalk occurring between a display driving and a touch sensing according to a structure that a touch electrode and a shield electrode are disposed in a touch display device according to aspects of the present disclosure.

FIG. 15 is a diagram illustrating an example of a crosstalk occurring between the display driving and the touch sensing according to a structure that the touch electrode TE and the shield electrode SE are disposed in the touch display device 100 according to aspects of the present disclosure.

Referring to FIG. 15, it illustrates the example that the signal supplied to the touch electrode TE is coupled according to the signal supplied to the data line DL.

<EX 1> illustrates the example of coupling between the signals in the case that the shield electrode SE is not disposed between the touch electrode TE and the data line DL.

<EX 2> illustrates, in a structure that the shield electrode SE is not disposed between the touch electrode TE and the data line DL, the example of coupling between the signals in the case that the touch electrode TE located on at least a part area of an area overlapped with the data line DL is removed.

Such as illustrated in <EX 1> and <EX 2>, by a structure that the touch electrode TE is cut on an area overlapped with the data line DL, it can be seen that a degree of being coupled is reduced from ΔV1 to ΔV2.

<EX 3> illustrates the example of coupling between the signals in the case that the shield electrode SE is disposed between the touch electrode TE and the data line DL.

<EX 4> illustrates, in a structure that the shield electrode SE is disposed between the touch electrode TE and the data line DL, the example of coupling between the signals in the case that the touch electrode TE and the shield electrode SE located on at least a part area of an area overlapped with the data line DL are removed.

Such as illustrated in <EX 3> and <EX 4>, by a structure that the touch electrode TE and the shield electrode SE are cut on an area overlapped with the data line DL, it can be seen that a degree of being coupled is reduced from ΔV3 to ΔV4.

According to aspects of the present disclosure, by disposing the shield electrode SE between the electrode for the touch sensing and the electrode for the display driving, an interference between the touch sensing and the display driving can be reduced.

Furthermore, as the touch electrode TE and the shield electrode SE are not disposed on some areas crossing the data line DL, the direct coupling between the data line DL and the touch line TL can be reduced, and the indirect coupling by the shield electrode SE can be reduced.

Furthermore, as the shield electrode SE is disposed by using a layer where the connecting pattern CP for an electrical connection between the touch electrode TE and the touch line TL is disposed, the shield electrode SE can be disposed without adding a separated layer.

In this case also, as the touch electrode TE and the shield electrode SE are not disposed on some areas of areas overlapped with the data line DL, an effect of coupling reduction can be provided.

And, as the shield electrode SE is disposed on some areas of areas which are overlapped with the data line DL and the touch electrode TE is not disposed, in the case that the shield electrode SE is disposed on a same layer as the connecting pattern CP, the performance of the touch sensing can be improved through the coupling reduction while maintaining a function of the noise blocking by the shield electrode SE stably.

The above description has been presented to enable any person skilled in the art to make and use the technical idea of the present disclosure, and has been provided in the context of a particular application and its requirements. Various modifications, additions and substitutions to the described aspects will be readily apparent to those skilled in the art, and the general principles defined herein may be applied to other aspects and applications without departing from the spirit and scope of the present disclosure. The above description and the accompanying drawings provide an example of the technical idea of the present disclosure for illustrative purposes only. That is, the disclosed aspects are intended to illustrate the scope of the technical idea of the present disclosure. Thus, the scope of the present disclosure is not limited to the aspects shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. A touch display device, comprising:
   a plurality of touch electrodes disposed in a display panel;
   a plurality of touch lines electrically connected to each of the plurality of touch electrodes; and
   at least one shield electrode disposed on an area overlapping with at least a portion of the plurality of touch electrodes and the plurality of touch lines,
   wherein the each of the plurality of touch electrodes comprises,
   at least one vertical sensor portion disposed in a first direction; and
   a plurality of horizontal sensor portions disposed in a second direction crossing the first direction and connected to the at least one vertical sensor portion,
   wherein the plurality of horizontal sensor portions comprises,
   at least one first horizontal sensor portion partially overlapping with a data line disposed in the display panel; and
   at least one second horizontal sensor portion shorter than the at least one first horizontal sensor portion and disposed on an area other than an area overlapping with the data line.

2. The touch display device of claim 1, wherein the at least one shield electrode is disposed on an area other than an area overlapping with the data line in an area adjacent to the at least one second horizontal sensor portion.

3. The touch display device of claim 1, wherein the at least one shield electrode is disposed on an area other than an area overlapping with the data line in an area adjacent to one of the at least one second horizontal sensor portion, and is disposed on an area overlapping with the data line in an area adjacent to other one of the at least one second horizontal sensor portion.

4. The touch display device of claim 1, wherein the at least one second horizontal sensor portion is disposed on an area between the at least one vertical sensor portion and the data line.

5. The touch display device of claim 1, further comprising:
   a plurality of connecting patterns disposed on a layer different from a layer where the plurality of touch electrodes and the plurality of touch lines are disposed, electrically connected to the at least one first horizontal sensor portion, and not connected to the at least one second horizontal sensor portion.

6. The touch display device of claim 5, wherein the plurality of connecting patterns is disposed on a same layer as a layer where the at least one shield electrode is disposed.

7. The touch display device of claim 1, further comprising at least one dummy pattern located between one of the plurality of touch lines and the at least one second horizontal sensor portion and disposed on an area other than an area overlapping with the data line.

8. The touch display device of claim 7, wherein the at least one dummy pattern is disposed on an area between the data line and the touch line.

9. The touch display device of claim 7, wherein the at least one dummy pattern is insulated from the plurality of touch electrodes and the plurality of touch lines.

10. The touch display device of claim 7, wherein one of the at least one shield electrode overlaps with the at least one dummy pattern and is floated.

11. The touch display device of claim 1, wherein the at least one shield electrode is supplied a signal different from a signal supplied to the plurality of touch electrodes and the plurality of touch lines.

12. The touch display device of claim 1, wherein the plurality of touch lines is disposed on an area overlapping with a driving voltage line disposed in the display panel.

13. The touch display device of claim 1, wherein the at least one vertical sensor portion is disposed on an area overlapping with a reference voltage line disposed in the display panel.

14. A touch display device, comprising:
a plurality of touch electrodes disposed in a display panel; and
a plurality of touch lines electrically connected to each of the plurality of touch electrodes,
wherein the each of the plurality of touch electrodes comprises,
at least one vertical sensor portion disposed in a first direction; and
a plurality of horizontal sensor portions disposed in a second direction crossing the first direction and connected to the at least one vertical sensor portion,
wherein the plurality of horizontal sensor portions comprises,
at least one first horizontal sensor portion partially overlapping with a data line disposed in the display panel; and
at least one second horizontal sensor portion shorter than the at least one first horizontal sensor portion and disposed on an area other than an area overlapping with the data line.

15. The touch display device of claim 14, further comprising at least one dummy pattern disposed on a same layer as a layer where the plurality of horizontal sensor portions is disposed, and disposed on an area other than an area overlapping with the plurality of touch electrodes, the plurality of touch lines and the data line.

16. A touch display device, comprising:
a plurality of data lines disposed in a display panel;
a plurality of touch electrodes and a plurality of touch lines disposed on a layer different from a layer where the plurality of data lines is disposed; and
at least one shield electrode disposed on a layer located between a layer where the plurality of data lines is disposed and a layer where the plurality of touch electrodes and the plurality of touch lines are disposed,
wherein the at least one shield electrode is disposed on some areas of a plurality of areas where the plurality of data lines is overlapped and the plurality of touch electrodes and the plurality of touch lines aren't disposed, and isn't disposed on other some areas of the plurality of areas.

17. The touch display device of claim 16, wherein one of the at least one shield electrode is located on an area between the data line and the touch line and is floated.

18. The touch display device of claim 16, wherein the at least one shield electrode is disposed on a same layer as a layer where a connecting pattern electrically connecting between the touch electrode and the touch line is disposed, and is separated from the connecting pattern.

19. The touch display device of claim 16, wherein at least one dummy pattern disposed on a same layer as a layer where the touch electrode and the touch line are disposed and separated from the touch electrode and the touch line is located on an area overlapping with the at least one shield electrode.

* * * * *